United States Patent [19]
Griffin et al.

[11] Patent Number: 5,313,273
[45] Date of Patent: May 17, 1994

[54] APPARATUS FOR CALIBRATING AN ANALOGUE SCREEN DISPLAY SYSTEM

[75] Inventors: Richard Griffin; Graham C. Evelin, both of Herts., England

[73] Assignee: Crosfield Electronics Limited, Herts, England

[21] Appl. No.: 969,398

[22] Filed: Oct. 30, 1992

[30] Foreign Application Priority Data
Oct. 31, 1991 [GB] United Kingdom ............... 9123105

[51] Int. Cl.⁵ .............................................. H04N 17/02
[52] U.S. Cl. ..................................... 348/189; 348/192
[58] Field of Search ...................... 358/10, 139, 29, 28; H04N 17/02

[56] References Cited

U.S. PATENT DOCUMENTS

| | | | |
|---|---|---|---|
| 4,183,049 | 1/1980 | Hosoya | 358/10 |
| 4,207,589 | 6/1980 | Kawasaki | 358/28 |
| 4,706,108 | 11/1987 | Kumagai et al. | 358/10 |

FOREIGN PATENT DOCUMENTS

| | | | |
|---|---|---|---|
| 0643951 | 6/1964 | Belgium | H04N 17/04 |
| 1021322 | 3/1966 | United Kingdom | H04N 9/02 |
| 1035401 | 7/1966 | United Kingdom | H04N 9/02 |

Primary Examiner—James J. Groody
Assistant Examiner—Glenton B. Burgess
Attorney, Agent, or Firm—Sughrue, Mion, Zinn, Macpeak & Seas

[57] ABSTRACT

Apparatus for use in calibrating a display system comprising digital-to-analogue converters (D.A.C) (11,12,13) for converting a digital colour control signal to analogue colour component signals which are suitable for controlling an electronic display. An analogue signal modifier modifies the signals from the D.A.C. The apparatus also comprises a switch (10) for connecting between the D.A.C. and the analogue signal modifier. The switch is operable in a first mode (52,54) to pass signals from the D.A.C. (11,12,13) directly to the analogue signal modifier or in a second mode (53) to pass analogue calibration colour component signals to the analogue signal modifier such that the appearance of the signals from the D.A.C. and the calibration signals can be visually compared on a screen (17) to determine whether any reproduction errors are in the D.A.C. (11,12,13) or in the signal modifier.

7 Claims, 4 Drawing Sheets

APPARATUS FOR CALIBRATING AN ANALOGUE SCREEN DISPLAY SYSTEM

FIELD OF THE INVENTION

This invention relates to apparatus for visual calibration of a screen display.

DESCRIPTION OF THE PRIOR ART

The type of screen display system with which the invention is concerned comprises digital-to-analogue conversion (D.A.C) means for converting a digital colour control signal to analogue colour component signals suitable for controlling an electronic display, and analogue signal modifying means for modifying the signals from the D.A.C. means. Such systems are hereinafter referred to as of the type described.

A colour monitor screen display can have a misalignment, where for example in response to a command to generate "white" the combination of red, green and blue values selected give grey or a colour cast. The areas where errors can be introduced are in the device that converts numerical data into electrical signals, the system of cables that passes the signal to the display device and the conversion of the signals into brightness variations by the display device. Before any misalignment can be corrected it is necessary to diagnose which of the sources of misalignment is responsible.

SUMMARY OF THE INVENTION

In accordance with the present invention, apparatus for use in calibrating a display system of the type described comprises switch means for connecting between the D.A.C. means and the analogue signal modifying means and operable in a first mode to pass signals from the D.A.C. means directly to the analogue signal modifying means or in a second mode to pass analogue calibration colour component signals to the analogue signal modifying means such that the appearance of the signals from the D.A.C. means and the calibration signals can be visually compared on the screen to determine whether any reproduction errors are in the D.A.C. means or in the signal modifying means.

The present invention provides a means of aligning a colour display and graphics generator to a reproducible state in order that the images displayed conform to a set of accepted standards. The standards are fixed at the time the system is configured and a comparison of the systems performance against a reference indicates whether any variation has occurred.

To avoid having to connect external test equipment in order to assess performance it is more convenient to have a reference built into the system, it will of course be necessary to ensure that the reference can be relied upon not to change its characteristics significantly over the lifetime of the equipment. If a change in the reference does occur, for example due to a fault, the characteristics of the device should be such that the change is made obvious.

The invention provides apparatus which a relatively unskilled person may use to diagnose the particular source of error or misalignment by a simple comparison of two output areas on a screen. The diagnosis may be made by a user and enables a technician to bring the correct equipment to remedy the fault.

The majority of graphics generators use Digital to Analogue Converters (DACs) that convert digital information in the form of numbers describing brightness levels into a voltage signal at the display unit. Monotonic variation of the numbers should produce monotonic variation of the voltage signal. However, some form of mathematical transformation is usually applied to the digital information to vary the conversion of particular numbers to specific voltage levels. By this means the output signal range from the DAC is not varied but the particular signal output for a specific input code is changed. The alignment of the display should be independent of any code transformations as should the initial alignment of the generator. For this reason the calibration apparatus allows setting of the white point of the display and generator combination as well as providing a visual check of colour fidelity in mid-tone regions. There is no need to check performance in black areas of the image as this is a function of the alignment of the specific display device alone.

Most display systems use signals that convey the image information as three signals within which is coded the colour information for the image. The RED signal conveys information defining the red component of the image, similarly the GREEN and BLUE signals. When the RED, GREEN and BLUE components are superimposed a coloured image is obtained.

If the relative proportions of RED, GREEN and BLUE are not correct a colour caste is introduced to the image which must be regarded as an error.

Different errors in generator or display can lead to the same corruption of image. For example, a green colour cast on the image can be caused by an excess of green signal produced by the generator, a lack of red and blue signal from the generator, faulty connections between the generator and display, an excess of green amplification within the display, or a shortage of red and blue amplification within the display. A first step in diagnosing the problem is the isolation of the error to either generator or display. To assist in this the invention manipulates the signal between display and generator. Because it is usual to "normalize" the inputs to a colour display such that equal signals fed to all inputs will produce a neutral monochrome image (i.e. shades of grey, black or white), feeding the same signal to all inputs should produce a neutral image. If such an image is not neutral any residual colour cast must be the result of errors within the display. If the image is neutral in tone the original error must exist within the generator.

It is possible to achieve a neutral image with one set of error conditions in the generator and a complementary error in the display. The technique of feeding one signal to all display inputs will highlight this condition and allow it to be eliminated.

Overall image display brightness can vary due to display device aging or a reduction in signal level from the generator. If a reference signal is supplied to the display instead of the raw, unmodified signal it can be used to check the output signal level from the generator. This can be achieved by displaying the reference signal on the display in one area and the raw, unmodified signal in an adjacent area, visual comparison of display brightness in the two areas gives an indication of the raw, unmodified signal level relative to the reference. An adjustment can be made using the display as an error indicator and because the comparison is performed on the final viewing device, once any visible error is removed no further error will be apparent.

Generally a user will test the electronic display by causing a white colour control signal input to be activated and comparing, by eye, the resultant raw signal displayed with a calibrated white display and making an appropriate deduction from this comparison.

The two displays mentioned above (raw signals and reference) may be augmented by a third simultaneous display comprising an average signal area produced by inputting to the display colour signals having the same value equal to the average of the raw colour signals.

The average signal area may be of a single average colour, but preferably a ramp function is applied to the signals input to the average signal area to provide a variation between black and white across at least a part of the average signal area. Preferably, a ramp function is applied to the raw colour signal.

Typically, each colour signal input to the colour display for the calibrated white signal is 0.7 volts and each colour signal input for a calibrated black signal 0 volts.

BRIEF DESCRIPTION OF THE DRAWINGS

An example of apparatus for visual calibration of a screen in accordance with the present invention will now be described with reference to the accompanying drawings, in which.

EMBODIMENT

It is assumed for the examples described below that no errors occur in processing of numerical data.

Figure 1:
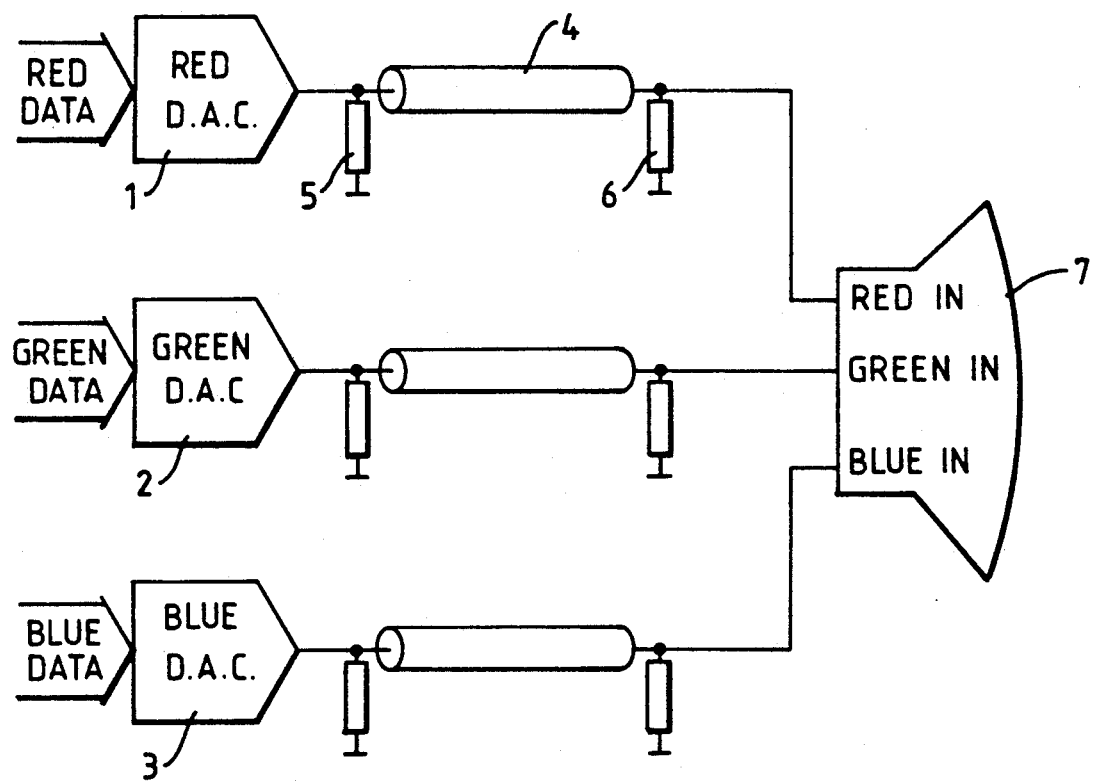
FIG. 1 is a block diagram of a conventional arrangement for driving a colour monitor.

FIG. 1 illustrates a conventional arrangement for driving a colour monitor. Digital colour data is input to digital-to-analogue converters 1,2,3 (the graphics generator) for red, green and blue channels respectively. The output signals are fed via coax cables 4, terminated at their source 5 and destination 6 in the correct impedance, to a display device 7 which is usually a colour monitor. The digital-to-analogue converters 1,2,3, produce three output currents representing the quantities fed into them as digital data. These currents are converted into voltage inputs at the monitor 7 by the source 5 and destination 6 impedances.

Figure 2:
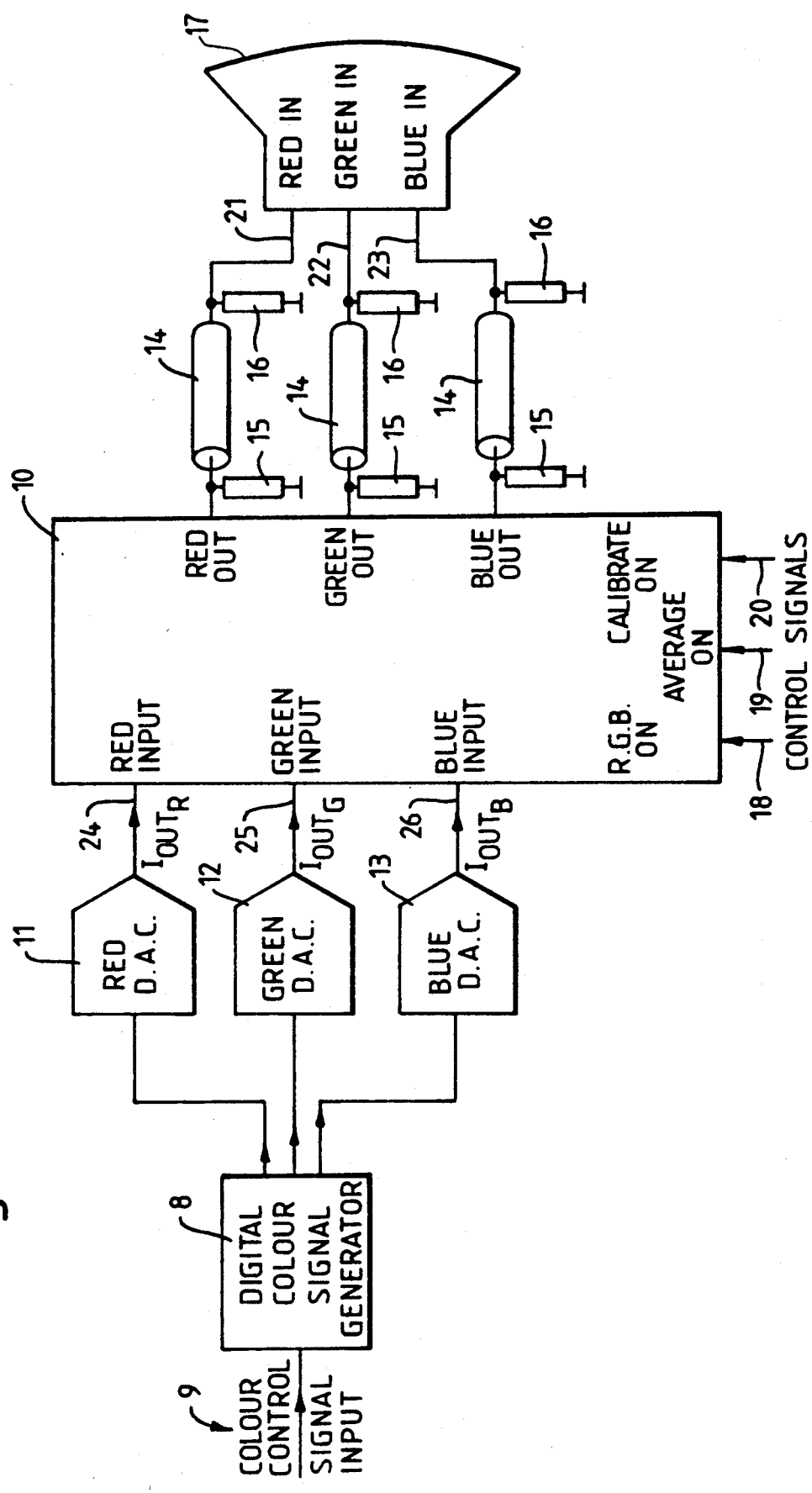
FIG. 2 is a block diagram of a circuit according to the present invention.

In FIG. 2 an example of the present invention is shown. A colour control signal 9 is input to a digital colour signal generator 8 to generate a digital representation of the required colour, for example white. The digital colour signal generator 8 outputs respective digital colour component values to each of the red, green and blue DACs The DACs convert the digital values into currents and output these currents to a matching device 10. The matching device is configured such that when the control signal input 18 is on, the matching device appears transparent to the currents output from the DACs and the currents are carried via the transmission lines 14, terminated at source and destination 15,16 which convert the currents to voltages to provide voltage drive signals at each colour input 21,22,23 to the monitor 17.

With the control signal for average outputs 19 set, the matching device internally averages the three signal currents 24,25,26 and produces signals at each of the three outputs equal to the average ($V_{av}$) of the input currents. If $V_r$ represents the Red signal to the display, $V_g$ the green and $V_b$ the blue, then the average signal ($V_{av}$) to be passed to the display is $$V_{av} = \frac{V_r + V_g + V_b}{3}$$

When the control signal for calibrate 20 is set a fixed reference current is sourced at each of the three outputs of the device 10.

The scanning mechanism of the display temporally and spatially multiplexes different portions of the image to different parts of the display to enable the three different signals to be simultaneously displayed allowing visual comparison. The activation of control signals is dependent upon the position of the scanning beam upon the display so that the averaged, unmodified and calibrated signals only appear on the display in their predefined regions.

Figure 3:
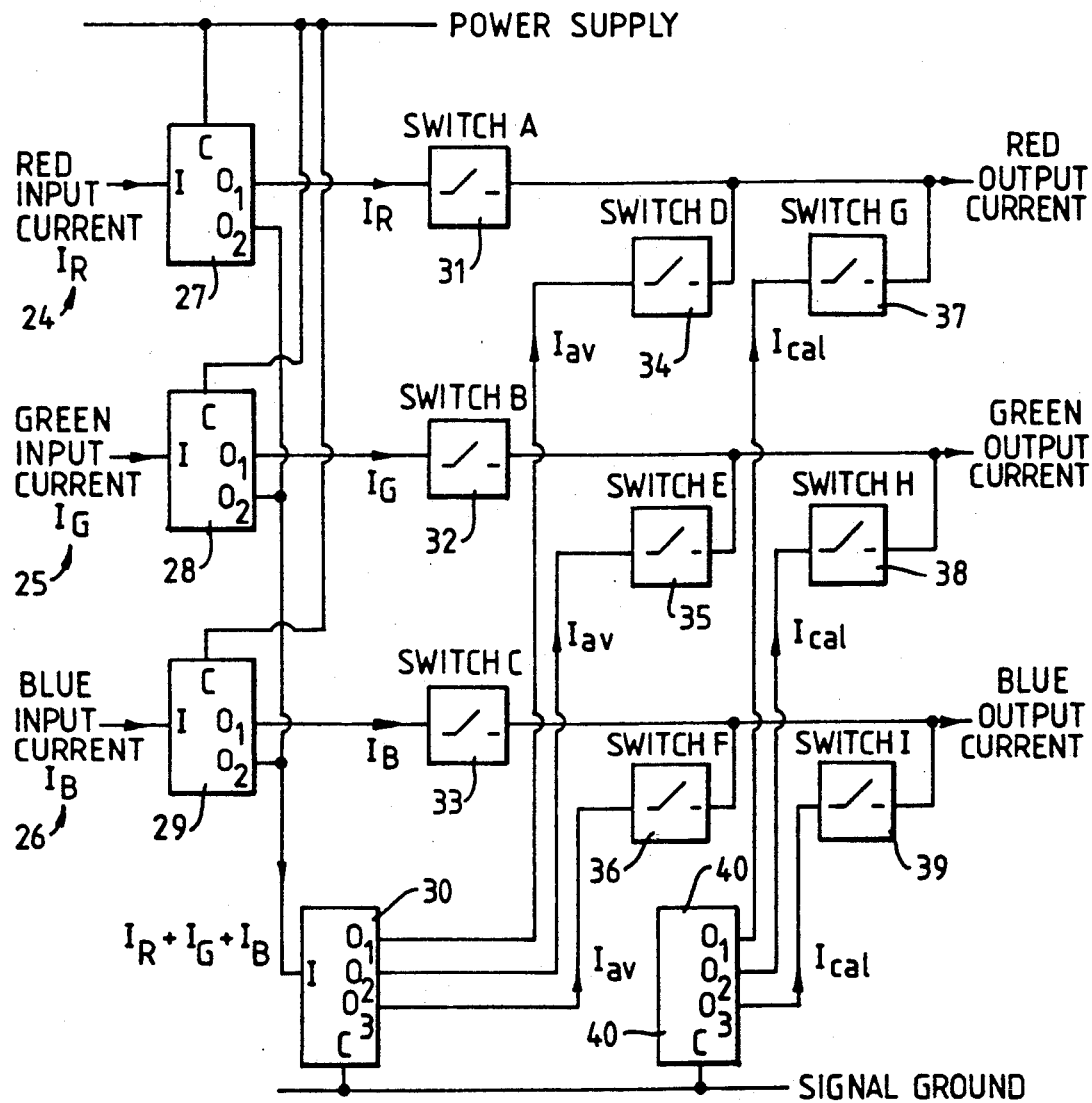
FIG. 3 shows one implementation of a matching device.

One implementation of the matching device 10 is shown in FIG. 3. Input currents 24,25,26 are input to current mirrors 27,28,29 which have a current gain of one and two identical outputs each. Another current mirror 30 is provided which has three identical outputs and a current gain of ⅓. When switches 31,32 and 33 are closed and the remaining switches in the circuit are open the matching device appears transparent and the input currents are transferred directly to the outputs without alteration. When the average control signal 19 is set switches 31-33 and 37-39 are open and switches 34-36 are closed. One output from each current mirror is taken, these are summed together and input to the current mirror 30. This produces three equal outputs, each equivalent to ⅓ of the summed input, which are then converted to equal red, green and blue drive voltages.

The calibrated signals are produced by opening switches 31-36 and closing switches 37-39. A current mirror 40 then provides appropriate calibration currents to each of the red, green and blue outputs.

The matching device 10 may be fabricated from matched semiconductor components, for example within an integrated circuit with all the components on the same substrate having similar collector areas so that close matching of a full current device can be achieved. Another arrangement is to produce the current mirrors 27-29 from one polarity of semi-conductor (e.g. NPN) and the current mirror 30 from the opposite polarity (e.g. PNP) of semiconductor. This minimises drift between the true signal path and the averaged or calibrated paths. By turning the current mirrors on and off using external control signals rather than switches signal distortion in the switches is substantially eliminated.

Figure 4:
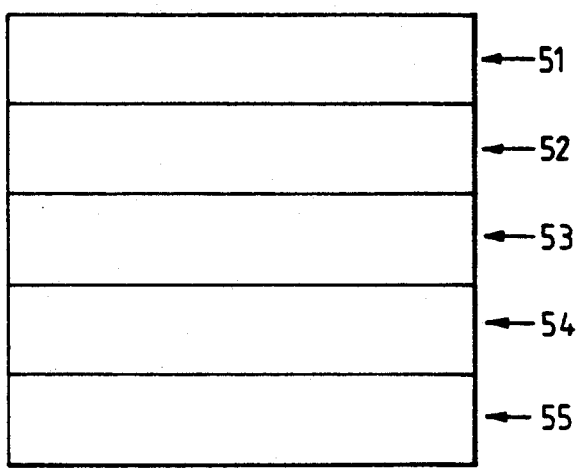
FIG. 4 illustrates the divisions of a test portion of a screen during calibration.

A number of examples will be described with reference to the display appearance. FIG. 4 illustrates the divisions of a test portion of a screen during calibration. Only the calibrated region 53 and unmodified regions 52,54 are essential although the averaged regions 51,55 simplify comparison of brightness for example when a colour cast is caused by the generator. Passing the signals through to the display is a function of the matching device acting as a time division multiplexing switch.

Figure 5:
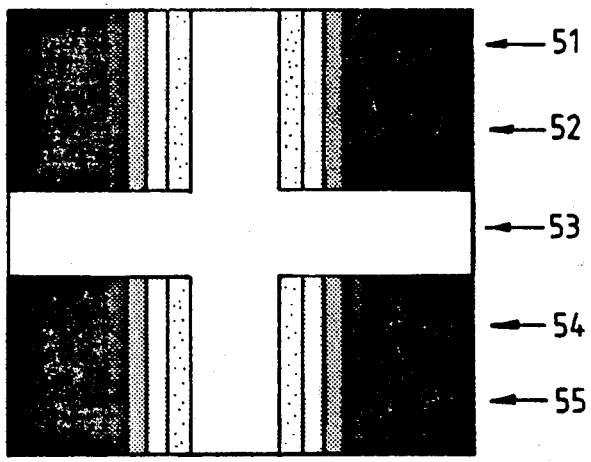
FIG. 5 shows the screen of FIG. 4 for a correctly aligned display system.

The resulting image that appears on the display when the system is correctly aligned is shown in FIG. 5. There are no visible transitions between the 5 regions 51,55 in the white portion of the image and no obvious colour cast on the image. Both the averaged regions 51,55 and unmodified regions 52,54 vary across the screen through a shaded area in the same manner due to the application of a ramp function.

Figure 6:
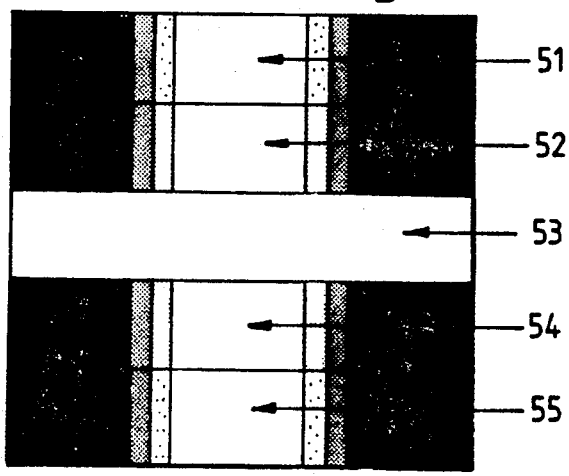
FIG. 6 illustrates the screen of FIG. 4 when an excess of red signal is being generated.

FIG. 6 illustrates one example of the appearance of an image when there is an error. If there is a 10% excess of red signal produced by the generator circuitry but no fault is present in the monitor then the display in normal use would have a red colour cast with the matching device working in its pass through mode. To test the cause of this colour cast the test graphics pattern is fed to the generator and the matching device activated.

In this example, the voltage signals produced for the red, green and blue signals to the display, $V_r$, $V_g$, and $V_b$ respectively, are $V_r$ = 110% normalized to 1.1
$V_g$ = 100% normalized to 1.0
$V_b$ = 100% normalized to 1.0
$V_{av}$ = 103% normalized to 1.03
$V_{cal}$ = 100% normalized to 1.0.

FIG. 6 shows how this will be displayed. The calibrated region 53 is displayed correctly as a white region of normalized brightness 1.0. The averaged regions 51,55 are displayed with their brightness value in the black area 0.0 but in the white area 1.03. The unmodified regions 52,54 have their black areas displayed with a brightness value of 0.0, but the white area will have red colour cast and a brightness value of 1.03. The colour cast in the shaded areas of the unmodified regions 52,54 also differs from that in the shaded areas of the averaged regions 51,55. Visible horizontal boundaries are present between the different regions. These indicate that the error is generator related, the apparent low intensity of the calibrated region indicates an excess of signal from the generator, and a red cast in the unmodified region indicates that it is the red signal which needs adjustment.

If the generator were correctly aligned, but the monitor had a red cast then the whole display would have a red cast.

In the event that both monitor and generator had errors one of which compensated for the other this could still be detected. If the monitor has a red cast and the generator has a lack of red amplification the appearance of the calibrated and averaged regions 53 and 51,55 would be red while the unmodified regions 52,54 would appear correctly colour balanced. There would be a visible division between the unmodified regions 52,54 and the calibrated region 53 due to the reduced contribution from the generator red output signal.

In both the above cases a comparison of the calibrated region brightness and unmodified signal region brightness would indicate whether the signal which needs adjustment needed an increase or decrease, although the presence of the averaged region with a white area in which the brightness differs from the calibrate region would enable this comparison to be made more easily than when the unmodified region white area has a colour cast.

One other condition can be highlighted by the display pattern. If there is an error in the matching of the linearity of the Red, Green, Blue amplifiers in the display device although the display correctly produces black and white areas, this will show as a vertical band of colour in the grey shaded areas of the image but will not appear as a colour cast in the calibrate region. The image can then be used to realign the amplifier matching unit until no error is seen.

In general, errors that appear in the image as vertical divisions or colour bands are display device related whereas visible horizontal divisions or bands indicate a generator error.

Once any mismatch of signal levels between generator outputs, calibrate signal and display sensitivity have been eliminated the conversion of signals to image brightness by the display can be set to suit the operator by means of the usual display brightness and contrast controls.

We claim:

1. Apparatus for use in calibrating an analogue display system comprising:

digital-to-analogue conversion (D.A.C.) means for converting digital color control signals to analogue colour component signals suitable for controlling an electronic display, and analogue signal modifying means for modifying the analogue colour component signals from the D.A.C. means and connected to a screen of the analogue display system; the apparatus further comprising:

switch means connected to said D.A.C. means and said analogue signal modifying means said switch means including means for producing analogue calibration color component signals, said switch means being operable in a first simultaneous display mode to pass said analogue colour component signals from said D.A.C. means directly to said analogue signal modifying means and operable in a second simultaneous display mode to pass said analogue calibration colour component signals to said analogue signal modifying means such that an appearance of said analogue colour component signals from said D.A.C. means and an appearance of said analogue calibration colour component signals can be visually compared on the screen of the analogue display system to determine whether any reproduction errors are in said D.A.C. means or in said analogue signal modifying means.

2. Apparatus according to claim 1, further comprising means for producing average analogue colour component signals having a value equal to an average of the analogue colour component signals of the first simultaneous display mode to provide an average signal area on said screen wherein said switch means is operable in a third simultaneous display mode to pass said average analogue colour component signals to said analogue signal modifying means such that an appearance of said average analogue colour component signals can be visually compared to the appearance of said analogue colour component signals from said D.A.C. means and the appearance of said analogue calibration colour component signals on said screen of said analogue display system.

3. Apparatus according to claim 2, wherein a ramp function is applied to the average analogue colour component signals to provide a variation between black and white across at least a part of said average signal area.

4. Apparatus according to claim 1, wherein a ramp function is applied to said analogue colour component signals of the first simultaneous display mode.

5. Apparatus according to claim 1, wherein each said analogue calibration colour component signal of the second simultaneous display mode input to said analogue signal modifying means for a calibrated white signal results in an output from said analogue signal modifying means of 0.7 volts.

6. Apparatus according to claim 1, wherein each said analogue calibration colour component signal of said second simultaneous display mode input to said analogue signal modifying means for a calibrated black signal results in an output from said analogue signal modifying means of 0 volts.

7. Apparatus according to claim 1, wherein the analogue colour component signals on the first simultaneous display mode comprise a white colour control signal input and the analogue calibration colour component signals of the second simultaneous display mode comprise a calibrated white display.

* * * * *